United States Patent
Goebel et al.

(10) Patent No.: US 7,291,414 B2
(45) Date of Patent: Nov. 6, 2007

(54) REACTANT FEED FOR NESTED STAMPED PLATES FOR A COMPACT FUEL CELL

(75) Inventors: Steven G. Goebel, Victor, NY (US); Jeffrey A. Rock, Fairport, NY (US)

(73) Assignee: General Motors Corporation, Detroit, MI (US)

( * ) Notice: Subject to any disclaimer, the term of this patent is extended or adjusted under 35 U.S.C. 154(b) by 395 days.

(21) Appl. No.: 11/009,378

(22) Filed: Dec. 10, 2004

(65) Prior Publication Data

US 2006/0127706 A1    Jun. 15, 2006

(51) Int. Cl.
H01M 2/00 (2006.01)
H01M 8/00 (2006.01)
H01M 8/04 (2006.01)
H01M 4/00 (2006.01)
H01M 4/86 (2006.01)

(52) U.S. Cl. .............................. 429/34; 429/12; 429/26; 429/27; 429/40

(58) Field of Classification Search ...................... None
See application file for complete search history.

(56) References Cited

U.S. PATENT DOCUMENTS 5,945,232 A * 8/1999 Ernst et al. .................... 429/32
6,261,710 B1 * 7/2001 Marianowski ................ 429/34
2003/0129473 A1 * 7/2003 Lee et al. ...................... 429/35
2004/0151974 A1   8/2004 Rock et al.

FOREIGN PATENT DOCUMENTS

EP         123960 A  * 11/1984

OTHER PUBLICATIONS

International Search Report PCT/US05/39178 dated Apr. 3, 2007 corresponding to this application.

* cited by examiner

*Primary Examiner*—Jonathan Crepeau
*Assistant Examiner*—Robert Hodge

(57) ABSTRACT

A fuel cell in a fuel cell stack that provides a transition from nested bipolar plates in the active region of the stack to non-nested bipolar plates in the inactive regions of the stack without giving up the reduced stack thickness provided by the nested plates or changing the size of the flow channels. Particularly, the diffusion media layers in the fuel cells are removed in the inactive regions where the bipolar plates are non-nested so that the volume necessary to maintain the size of the flow channels is provided without the need to increase the distance between adjacent MEAs. A thin shim can be provided between the membranes and the plates in the inactive regions to support the membrane where the diffusion media layer has been removed to prevent the membrane from intruding into the flow channels and blocking the reactive flow.

17 Claims, 4 Drawing Sheets

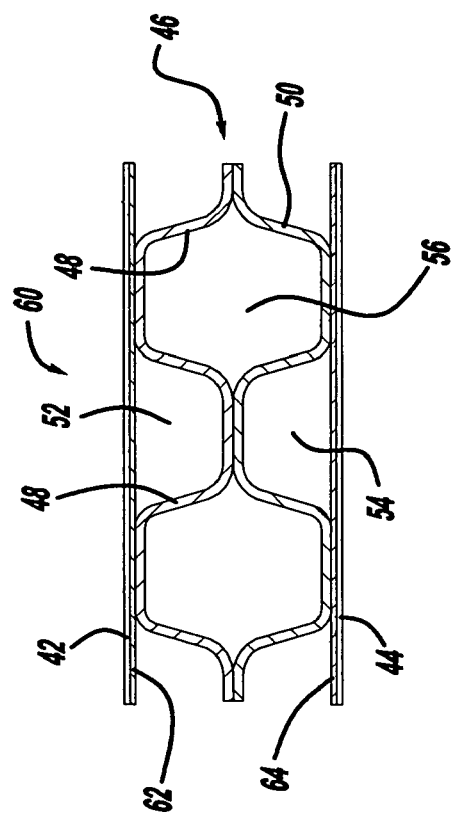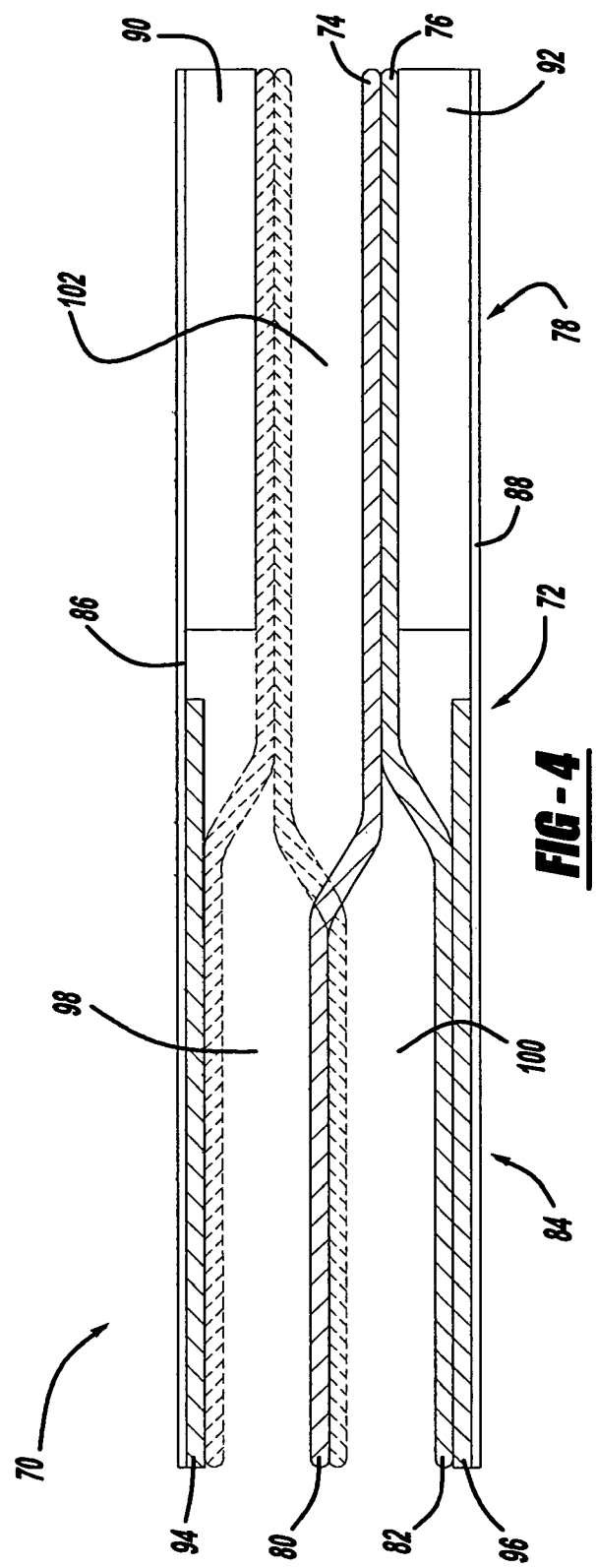

REACTANT FEED FOR NESTED STAMPED PLATES FOR A COMPACT FUEL CELL

BACKGROUND OF THE INVENTION

1. Field of the Invention

This invention relates generally to a fuel cell for a fuel cell stack and, more particularly, to a fuel cell for a fuel cell stack, where the fuel cell includes nested flow channels in an active region of the fuel cell and non-nested flow channels in inactive feed regions of the fuel cell, and where the diffusion media layers in the cells are removed in the inactive feed regions to provide more space for the non-nested channels.

2. Discussion of the Related Art

Hydrogen is an attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of flow field plates or bipolar plates positioned between the several MEAs in the stack. The bipolar plates include an anode side and a cathode side for adjacent fuel cells in the stack. Anode gas flow channels are provided in the anode side of the bipolar plates that allow the anode gas to flow to the anode side of each MEA. Cathode gas flow channels are provided in the cathode side of the bipolar plates that allow the cathode gas to flow to the cathode side of each MEA. The bipolar plates are made of a conductive material, such as stainless steel, so that they conduct the electricity generated by the fuel cells from one cell to the next cell as well as out of the stack.

It has previously been proposed by the inventors in U.S. patent application Ser. No. 10/661,195, titled Nested Stamped Plates for a Compact Fuel Cell, filed Sep. 12, 2003, that the thickness or repeat distance of a fuel cell stack can be reduced by nesting the flow channels in the active region of the fuel cells. FIG. 1 is a cross-sectional view of a portion of a fuel cell stack 10 showing this proposed design. The fuel cell stack 10 includes two MEAs 12 and 14 for adjacent fuel cells in the stack 10. Each MEA 12 and 14 includes a membrane of the type referred to above and an anode side catalyst layer and a cathode side catalyst later. An anode side gas diffusion media layer 16 is positioned adjacent to the MEA 12 and a cathode side gas diffusion media layer 18 is positioned adjacent to the MEA 14. The diffusion media layers 16 and 18 are porous layers that provide for input gas transport to and water transport from the MEAs 12 and 14. Various techniques are known in the art for depositing the catalyst layers on the membranes in the MEAs 12 and 14 or on the diffusion media layers 16 and 18.

A bipolar plate assembly 20 is positioned between the diffusion media layers 16 and 18. The bipolar plate assembly 20 includes two stamped metal bipolar plates 22 and 24 that are assembled together in the nested configuration as shown. The nested plates 22 and 24 define parallel anode gas flow channels 28 and parallel cathode gas flow channels 30, where the anode flow channels 28 provide a hydrogen flow to the anode side of the MEA 12 and the cathode flow channels 30 provide airflow to the cathode side of the MEA 14. Additionally, the plates 22 and 24 define coolant flow channels 32 through which a cooling fluid flows to cool the fuel cell stack 10, as is well understood in the art. In this design, the size of the coolant flow channels 32 is reduced from the size of the cooling channels provided in the non-nested stamped plates of the prior art, which provides the reduction in the repeat distance of the fuel cell stack 10. Reducing the size of the coolant flow channels 32 over the known cooling channels does not significantly affect the cooling capability of the cooling channels because the larger channels were more than adequate to provide the necessary cooling. The reduction in coolant volume also reduces the thermal mass that must be heated during system start-up.

The anode flow channels 28 are in fluid communication with an anode flow channel header at each end of the fuel cell stack 10, where one header receives the anode gas flow to distribute it to the anode gas flow channels 28 and the other anode header receives the anode exhaust gas from the anode flow channels. Likewise, the cathode gas flow channels 30 are in fluid communication with a cathode flow channel header at each end of the stack 10, and the cooling flow channels 32 are in fluid communication with a coolant flow channel header at each end of the stack 10. However, in order to couple the anode flow channels 28 to the anode channel headers, the cathode flow channels 30 to the cathode channel headers and the coolant flow channels 32 to the coolant channel headers, it is necessary to separate and un-nest the plates 22 and 24 in the non-active feed regions of the stack.

Because the non-nested configuration of the flow channels 28, 30 and 32 requires more space than the nested configuration of the channels 28, 30 and 32, the reduction in thickness of the stack 10 provided by the nested configuration would be eliminated by using the known non-nested configuration in the inactive regions. It is possible to reduce the size of the flow channels 28, 30 and 32 in the non-nested inactive regions so that the flow channels 28, 30 and 32 do not use more space than they use in the nested configuration. However, such a reduction in the size of the channels 28, 30 and 32 would cause a pressure drop across the channels that would adversely affect the flow rate and performance of the stack 10.

The present invention proposes a solution to a transition from the nested configuration to the non-nested configuration of the bipolar plates without reducing the size of the channels or increasing the thickness of the stack.

SUMMARY OF THE INVENTION

In accordance with the teachings of the present invention, a fuel cell in a fuel cell stack is disclosed that provides a transition from nested bipolar plates in the active region of the stack to non-nested bipolar plates in the inactive feed regions of the stack without giving up the reduced stack thickness provided by the nested plates or changing the size of the flow channels. Particularly, the diffusion media layers in the fuel cells of the stack are removed in the inactive feed regions where the bipolar plates are non-nested so that the volume necessary to maintain the size of the flow channels is provided without the need to increase the distance between adjacent MEAs. Additionally, the membrane of the MEAs would not be catalyzed in the inactive regions. A thin shim can be provided between the membranes and the plates in the inactive regions to support the membrane where the diffusion media layer has been removed to prevent the membrane from intruding into the flow channels and blocking the reactive flow.

Additional advantages and features of the present invention will become apparent from the following description and appended claims, taken in conjunction with the accompanying drawings.

BRIEF DESCRIPTION OF THE DRAWINGS

FIG. 3 is a partial cross-sectional view of an inactive feed region of a fuel cell stack employing non-nested stamped bipolar plates where the gas diffusion media layers have been removed and shims have been added, according to another embodiment of the present invention;

FIG. 4 is a partial cross-sectional view of the transition between an inactive feed region and an active region of a fuel cell stack, according to the invention;

DETAILED DESCRIPTION OF THE EMBODIMENTS

The following discussion of the embodiments of the invention directed to a fuel cell design is merely exemplary in nature, and is in no way intended to limit the invention or its applications or uses.

Figure 1:
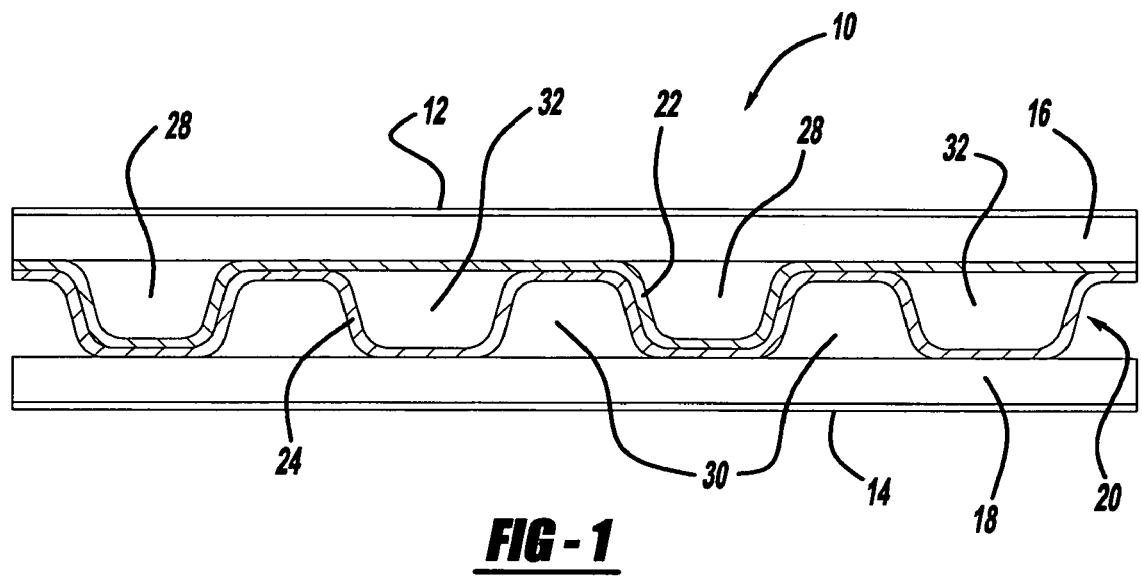
FIG. 1 is a partial cross-sectional view of an active region of a fuel cell stack employing nested stamped bipolar plates.
Figure 2:
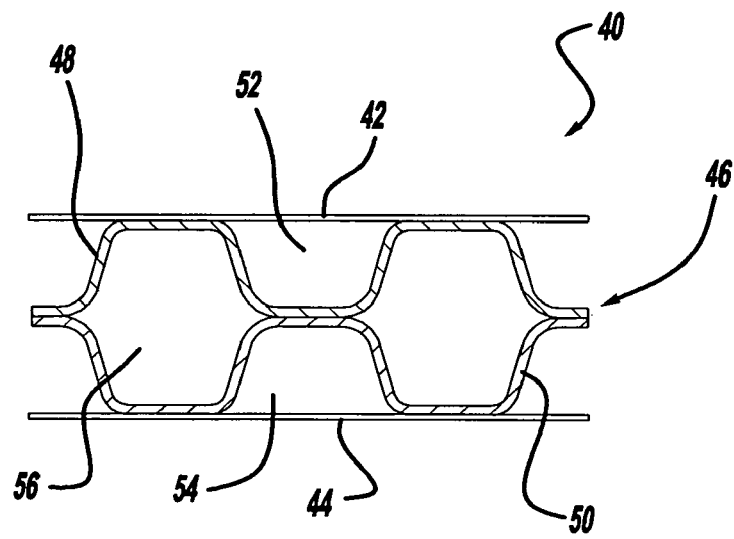
FIG. 2 is a partial cross-sectional view of an inactive feed region of a fuel cell stack employing non-nested stamped bipolar plates where the gas diffusion media layers have been removed, according to an embodiment of the present invention.

According to the present invention, a fuel cell design is described that includes nested stamped bipolar plates in an active region of the fuel cell and non-nested stamped bipolar plates in an inactive feed region of the fuel cell. FIG. 2 is a partial cross-sectional view through an inactive feed region of a fuel cell stack 40. The stack 40 includes adjacent membranes 42 and 44 that are part of two adjacent MEAs in the stack 40. The fuel cell stack 40 also includes a bipolar plate assembly 46 having two stamped non-nested bipolar plates 48 and 50. The plates 48 and 50 are stamped so that they define anode flow channels 52, cathode flow channels 54 and coolant flow channels 56.

It is necessary that the plates 48 and 50 be non-nested in the feed regions of the stack 40 so that the input gasses and the cooling fluid can be separated and coupled to appropriate manifold headers. The fuel cell stack 40 would include a transition region, discussed below, between the active region and the inactive regions of the fuel cell stack 40 where the anode flow channels 52 are in fluid communication with the anode flow channels 28, the cathode flow channels 54 are in fluid communication with the cathode channels 30 and the coolant flow channels 56 are in fluid communication with the coolant flow channels 32.

According to the invention, the size of the non-nested channels 52 and 54 are the same, or nearly the same, as the size of the nested channels 28 and 30, respectively, by eliminating the diffusion media layers 16 and 18 in the inactive feed regions of the fuel cell stack 40. In the inactive feed regions, the catalyst layers of the MEAs 12 and 14 would also be eliminated leaving sub-gasketed membranes 42 and 44. Note that the MEAs 12 and 14 would typically include a sub-gasket (not shown) outside of the active region. The sub-gasket prevents direct contact of the ionomer membrane to the plates 48 and 50 or the seals. The sub-gasket would typically a 0.25 µm film of Kapton or other suitable plastic. Therefore, the volume that was used by the diffusion media layers 16 and 18 in the active region of the fuel cell stack 40 can be used to accommodate the non-nested bipolar plates 48 and 50 in the inactive regions so that the size of the flow channels can be maintained without increasing the repeat distance of the stack 40. The diffusion media layers 16 and 18 are generally about 0.2 mm thick, which is enough to provide the necessary space.

The size of the coolant flow channels 56 does increase to about twice the size from the nested configuration to the non-nested configuration, but the pressure drop provided by the coolant channel transition does not adversely affect the performance of the stack 40. Further, the inactive feed regions with non-nested plates may increase the plate footprint for the active region, but the overall volume of the stack is reduced because of the decrease in stack height provided by the nested plates.

Because the membranes 42 and 44 are not supported by the diffusion media layers 16 and 18 in the feed regions of the stack 40, they may have a tendency to intrude into the flow channels 52 and 54. As the MEA typically includes sub-gaskets beyond the active region, with sufficient thickness, the sub-gaskets could provide adequate membrane support in the feed regions. FIG. 3 is a cross-sectional view of a fuel cell stack 60 that is similar to the fuel cell stack 40, where like elements are identified by the same reference numeral. The fuel cell stack 60 includes a thin shim 62 positioned between the membrane 42 and the plate 48 and a thin shim 64 positioned between the membrane 44 and the plate 50. The shims 62 and 64 prevent the membranes 42 and 44, respectively, from intruding into the flow channels 52 and 54, respectively. The shims 62 and 64 can be located in place or can be either bonded to the membranes 42 and 44, respectively, or to the plates 48 and 50, respectively. The shims 62 and 64 may also function as a gasket carrier. The shims 62 and 64 can be made of any suitable material, such as metal or plastic, and can have a suitable thickness, such as 0.025 μm, to provide the desired support.

FIG. 4 is a cross-sectional view of a portion of a fuel cell stack 70 showing an example of a transition region 72 between nested bipolar plates 74 and 76 in an active region 78 of the fuel cell stack 70 and non-nested bipolar plates 80 and 82 in an inactive feed region 84 of the fuel cell stack 70. The fuel cell stack 70 includes membranes 86 and 88 extending across the active region 78 and the inactive region 84. Gas diffusion media layers 90 and 92 are provided adjacent to the membranes 86 and 88, respectively, in the active region 78. Shims 94 and 96 are positioned between the non-nested plates 80 and 82 and the membranes 86 and 88, respectively, in the inactive region 84. The relative size of anode and cathode flow channels 98 and 100 in the inactive region 84 and the active region 78 are substantially the same. Flow channel 102 in the active region 78 can represent any of the anode flow channel, the cathode flow channel or the coolant flow channel.

Figure 5:
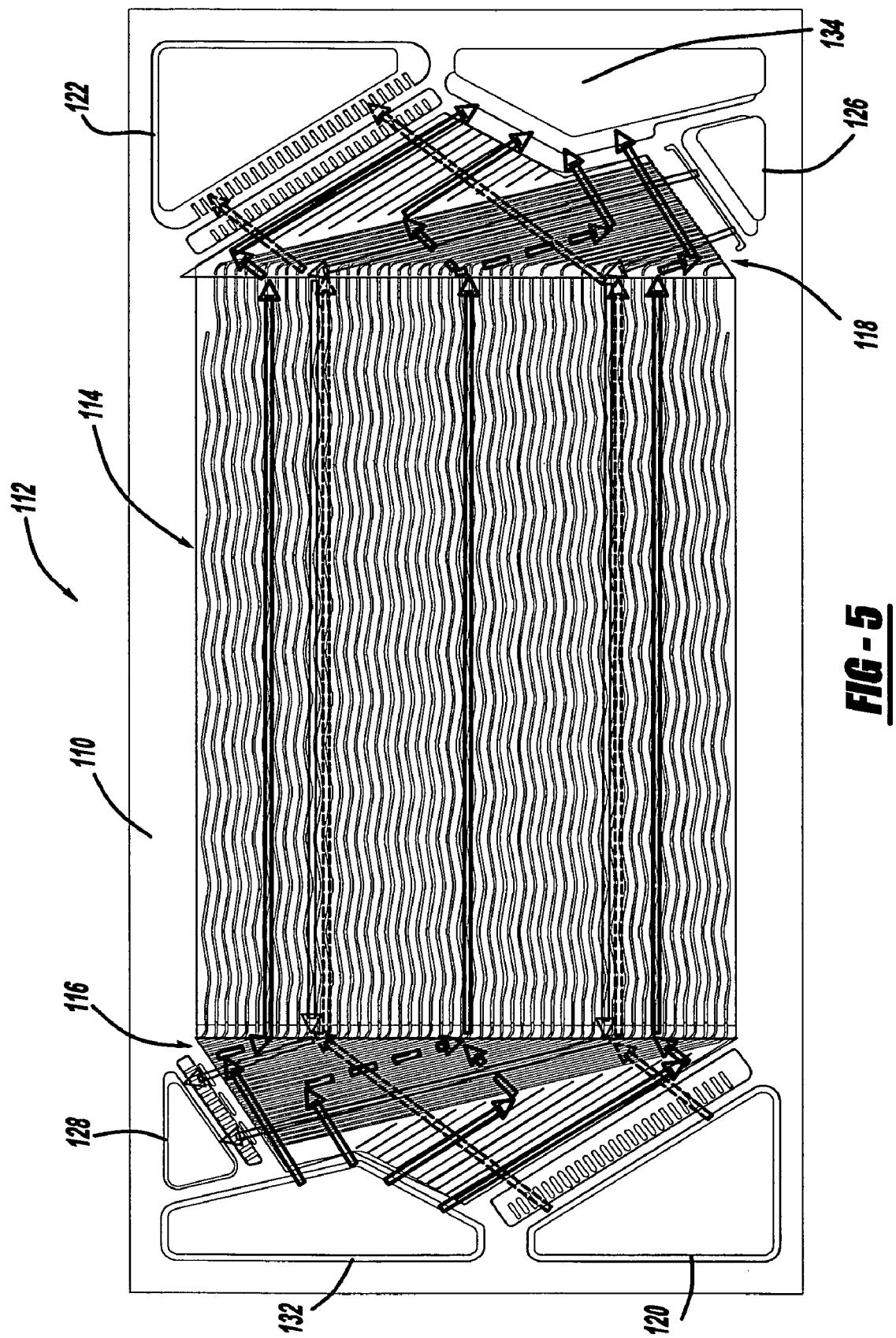
FIG. 5 is a top view of a plate in a fuel cell stack, according to an embodiment of the present invention.

FIG. 5 is top view of a bipolar plate assembly 110 in a fuel cell stack 112. The fuel cell stack 112 includes an active region 114 having stamped bipolar plates that are nested, and inactive feed regions 116 and 118, at opposite ends of the active region 114, having stamped bipolar plates that are non-nested, consistent with the discussion above. The stamped bipolar plates include the various flow channels discussed above. A cathode inlet header 120 at one end of the fuel cell stack 112 directs the cathode air into the cathode flow channels in the inactive region 116. The cathode air flows through the cathode flow channels in the inactive feed region 116, through the cathode flow channels in the active region 114 and through the cathode flow channels in the inactive region 118. The cathode exhaust gas is collected by a cathode outlet header 122.

An anode inlet header 126 at one end of the fuel cell stack 112 directs the hydrogen gas into the anode flow channels in the inactive region 118. The hydrogen gas flows through the anode flow channels in the inactive feed region 118, through the anode flow channels in the active region 114 and through the anode flow channels in the inactive region 116. The anode exhaust gas is collected by an anode outlet header 128. In this non-limiting embodiment, the anode gas and the cathode gas are counter-flow.

A coolant inlet header 132 at one end of the fuel cell stack 112 directs the cooling fluid into the coolant flow channels in the inactive region 116. The cooling fluid flows through the coolant flow channels in the inactive feed region 116, through the coolant flow channels in the active region 114 and through the coolant flow channels in the inactive region 118. The cooling fluid is collected by a coolant outlet header 134.

Figure 6:
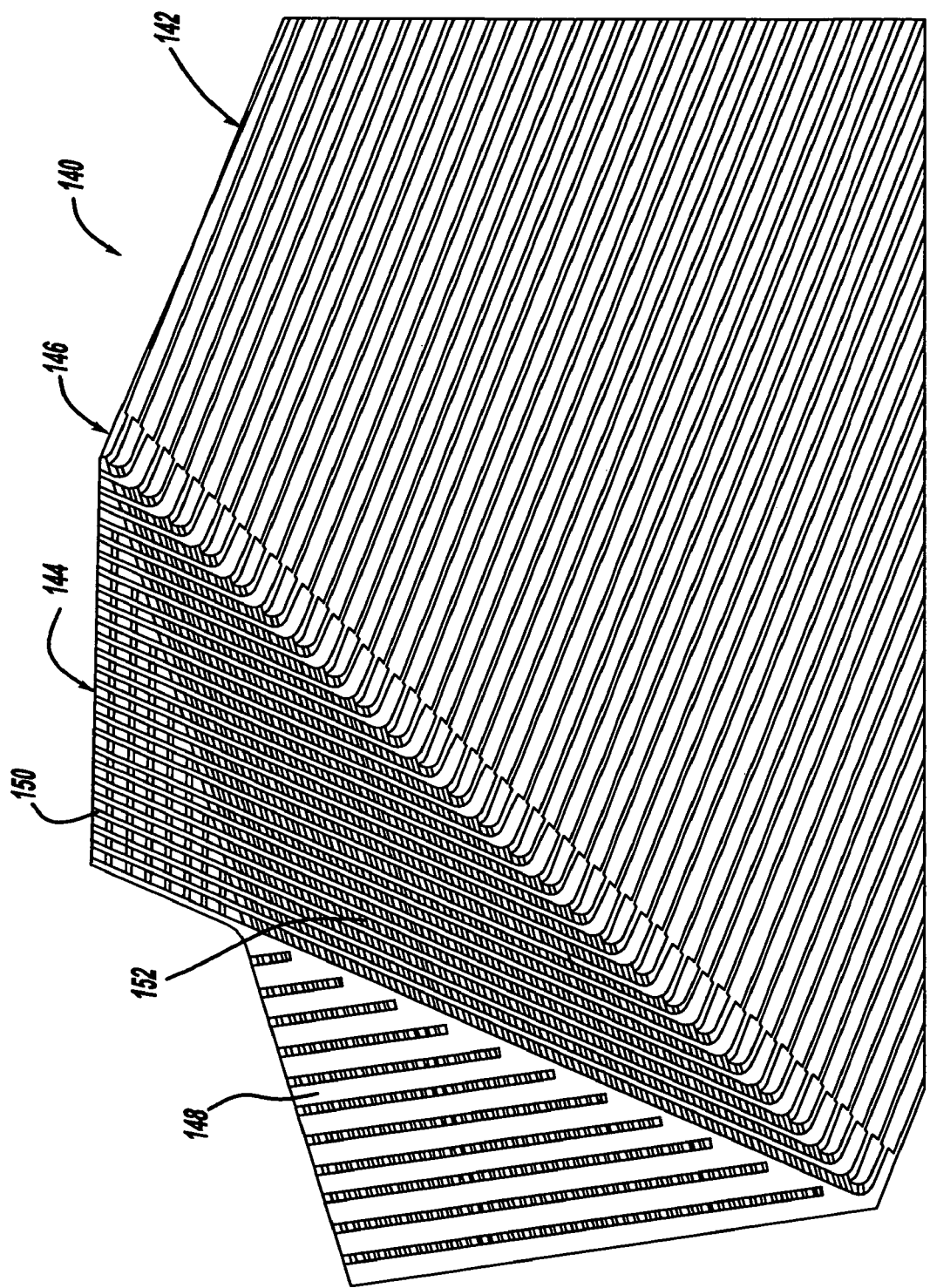
FIG. 6 is a solid model of a fuel cell stack including an active region having nested stamped bipolar plates and an inactive feed region having non-nested stamped bipolar plates.

FIG. 6 is a solid model perspective view of a fuel cell stack 140 including an active region 142 having the nested bipolar plates and an inactive feed region 144 having the non-nested bipolar plates. A transition region 146 between the region 142 and the region 144 provides the transition of the channels from the nested configuration to the non-nested configuration. The cooling fluid from the coolant header (not shown in FIG. 6) is directed into flow channels 148 in the inactive region 144, the hydrogen gas flow from the anode header (not shown in FIG. 6) is directed into flow channels 150 in the inactive region 144 and the cathode gas from the cathode header (not shown in FIG. 6) is directed into flow channels 152 in the inactive region 144. In this embodiment, the anode gas and the cathode gas are co-flow.

Table 1 below provides a comparison of various parameters discussed above for a nested plate design, a non-nested plate design and a nested plate design including half height channels. This data is from a fuel cell stack including a 360 cm² active area, 200 cells, 66 kW output power, 1.5 Acm² current density and a low pressure. The nested designs are smaller (higher kW/l) and have an even greater reduction in thermal mass from 27 to 19-20 kJ/K due to the reduced coolant volume. The half height feed region provides a smaller stack than the nested present invention because the feed regions can be active regions. However, the pressure drop due to these very shallow feed channels leads to an unacceptably high pressure drop (85 kPa vs 30 kPa on the cathode side).

TABLE 1

| | Nested (present invention) | Non-nested | Nested (half height feed channels) |
|---|---|---|---|
| Channel depth (mm) | 0.34 | 0.35 | 0.34 |
| An ch depth (mm) | — | 0.31 | — |
| Channel depth (mm) (no region GDM) | 0.37 | — | 0.37 |
| repeat distance (mm) | 0.97 | 1.29 | 0.97 |
| An dP (kPa) | 13 | 13 | 30 |
| Ca dP (kPa) | 30 | 30 | 85 |
| Coolant dp (kPa) | 57 | 22 | 106 |
| Power density (kW/l) | 6.0 | 4.8 | 6.3 |
| Thermal mass (kJ/K) (with coolant) | 20 | 27 | 19 |

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell stack comprising:

an active region including a stack of fuel cells, each fuel cell including a membrane electrode assembly (MEA) having a cathode side and an anode side, a cathode side diffusion media layer on the cathode side of the MEA, an anode side diffusion media layer on the anode side of the MEA, and an active region bipolar plate assembly positioned between opposing diffusion media layers in adjacent fuel cells, wherein the active region bipolar plate assembly includes nested bipolar plates defining cathode side flow channels and anode side flow channels; and an inactive feed region including a stack of membranes that form part of the MEAs in the stack of fuel cells and a feed region bipolar plate assembly, wherein the feed region bipolar plate assembly includes non-nested bipolar plates defining cathode side flow channels and anode side flow channels, where the cathode side flow channels in the feed region are in fluid communication with and are about the same size as the cathode side channels in the active region and the anode side flow channels in the feed region are in fluid communication with and are about the same size as the anode side flow channels in the active region, wherein the fuel cells do not include diffusion media layers in the inactive feed region.

2. The fuel cell stack according to claim 1 further comprising shims positioned adjacent to the membranes in the inactive feed region for supporting the membranes.

3. The fuel cell stack according to claim 1 wherein the nested bipolar plates and the non-nested bipolar plates are stamped plates.

4. The fuel cell stack according to claim 1 wherein the non-nested bipolar plates also define coolant flow channels and the nested bipolar plates also define coolant flow channels, wherein the coolant flow channels in the inactive feed region are in fluid communication with the coolant flow channels in the active region.

5. The fuel cell according to claim 4 wherein the coolant flow channels in inactive feed region are about twice the size as the coolant flow channels in the active region.

6. The fuel cell stack according to claim 1 wherein the fuel cell stack is on a vehicle.

7. A fuel cell comprising an inactive feed region having a membrane and an inactive region bipolar plate assembly, wherein the inactive region bipolar plate assembly includes non-nested bipolar plates defining cathode side flow channels and anode side flow channels, and wherein the inactive region does not include diffusion media layers, said fuel cell further comprising an active region including an active region bipolar plate assembly, said active region bipolar plate assembly including nested bipolar plates defining cathode side flow channels and anode side flow channels, wherein the cathode side flow channels in the inactive region are in fluid communication with cathode side flow channels in the active region and the anode side flow channels in the inactive region are in fluid communication with anode side flow channels in the active region.

8. The fuel cell according to claim 7 wherein the non-nested bipolar plates are stamped plates.

9. The fuel cell according to claim 7 wherein the nested bipolar plates are stamped plates.

10. The fuel cell according to claim 7 wherein the anode and cathode flow channels in the inactive region are about the same size as the anode and cathode flow channels in the active region.

11. The fuel cell according to claim 7 wherein the non-nested bipolar plates also define coolant flow channels and the nested bipolar plates also define coolant flow channels, wherein the coolant flow channels in the inactive region are in fluid communication with the coolant flow channels in the active region.

12. The fuel cell according to claim 11 wherein the coolant flow channels in inactive region are about twice the size as the coolant flow channels in the active region.

13. The fuel cell according to claim 7 further comprising a shim positioned adjacent to the membrane for supporting the membranes.

14. The fuel cell according to claim 7 wherein the fuel cell is part of a fuel cell stack is on a vehicle.

15. A fuel cell comprising:
an inactive feed region having a membrane and an inactive region bipolar plate assembly, wherein the inactive region bipolar plate assembly includes non-nested stamped bipolar plates defining cathode side flow channels, anode side flow channels and coolant flow channels, and wherein the inactive region does not include diffusion media layers; and
an active region including an active region bipolar plate assembly, said active region bipolar plate assembly including nested stamped bipolar plates defining cathode side flow channels, anode side flow channels and coolant flow channels, wherein the cathode side flow channels in the inactive region are in fluid communication with cathode side flow channels in the active region, the anode side flow channels in the inactive region are in fluid communication with the anode side flow channels in the active region, and the coolant flow channels in the inactive region are in fluid communication with the coolant flow channels in the active region, and wherein the coolant flow channels in inactive region are about twice the size as the coolant flow channels in the active region.

16. The fuel cell according to claim 15 further comprising a shim positioned adjacent to the membrane for supporting the membranes.

17. The fuel cell according to claim 15 wherein the fuel cell is part of a fuel cell stack is on a vehicle.

* * * * *